(12) United States Patent
An et al.

(10) Patent No.: US 11,392,087 B2
(45) Date of Patent: Jul. 19, 2022

(54) HOLOGRAPHIC DISPLAY DEVICE CAPABLE OF REDUCING CHROMATIC ABERRATION

(71) Applicant: SAMSUNG ELECTRONICS CO., LTD., Suwon-si (KR)

(72) Inventors: Jungkwuen An, Suwon-si (KR); Hoon Song, Yongin-si (KR); Hongseok Lee, Seoul (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 465 days.

(21) Appl. No.: 16/037,138

(22) Filed: Jul. 17, 2018

(65) Prior Publication Data
US 2019/0212700 A1 Jul. 11, 2019

(30) Foreign Application Priority Data
Jan. 5, 2018 (KR) .................. 10-2018-0001853

(51) Int. Cl.
| | | |
|---|---|---|
| *G03H 1/32* | (2006.01) | |
| *G02B 5/18* | (2006.01) | |
| *G02B 5/32* | (2006.01) | |
| *G02B 13/18* | (2006.01) | |
| *F21V 8/00* | (2006.01) | |
| *G03H 1/22* | (2006.01) | |
| *G02B 5/30* | (2006.01) | |
| *G03H 1/02* | (2006.01) | |

(52) U.S. Cl.
CPC ......... *G03H 1/2294* (2013.01); *G02B 5/1842* (2013.01); *G02B 5/30* (2013.01); *G02B 5/32* (2013.01); *G02B 6/0026* (2013.01); *G02B 13/18* (2013.01); *G03H 1/2205* (2013.01); *G03H 2001/0216* (2013.01); *G03H 2001/221* (2013.01); *G03H 2001/2271* (2013.01); *G03H 2210/30* (2013.01); *G03H 2222/31* (2013.01); *G03H 2223/17* (2013.01)

(58) Field of Classification Search
CPC ............. G03H 1/2294; G03H 1/2205; G03H 2001/2271; G03H 2210/30; G03H 2001/221; G03H 2001/0216; G03H 2222/31; G03H 2223/17; G02B 5/1842; G02B 13/18; G02B 5/32; G02B 5/30; G02B 6/0026; G02B 30/25; G02B 6/0011
USPC ................................. 359/16, 15, 298; 349/15
See application file for complete search history.

(56) References Cited

U.S. PATENT DOCUMENTS

| | | |
|---|---|---|
| 7,345,267 B2 | 3/2008 | Jung et al. |
| 9,658,378 B2 | 5/2017 | Song et al. |
| 9,720,246 B2 | 8/2017 | Won et al. |
| 2011/0255031 A1 | 10/2011 | Abe |
| 2013/0335795 A1 | 12/2013 | Song et al. |

(Continued)

FOREIGN PATENT DOCUMENTS

| | | |
|---|---|---|
| JP | 3327513 B2 | 9/2002 |
| KR | 10-2014-0114651 A | 9/2014 |

(Continued)

*Primary Examiner* — Marin Pichler
(74) *Attorney, Agent, or Firm* — Sughrue Mion, PLLC

(57) ABSTRACT

A holographic display device including a field lens focusing a three-dimensional (3D) image reproduced by a holographic display, wherein the field lens includes an anisotropic diffractive lens functioning as a lens with respect to a specific polarization.

17 Claims, 8 Drawing Sheets

(56) References Cited

U.S. PATENT DOCUMENTS

| | | |
|---|---|---|
| 2014/0016051 A1* | 1/2014 | Kroll .................. G02B 30/26 349/15 |
| 2015/0205182 A1 | 7/2015 | Leister |
| 2016/0011353 A1 | 1/2016 | Escuti et al. |
| 2016/0103321 A1 | 4/2016 | An et al. |

FOREIGN PATENT DOCUMENTS

| | | |
|---|---|---|
| WO | 2014016403 A1 | 1/2014 |
| WO | 2014159045 A1 | 10/2014 |

* cited by examiner

HOLOGRAPHIC DISPLAY DEVICE CAPABLE OF REDUCING CHROMATIC ABERRATION

CROSS-REFERENCE TO RELATED APPLICATION(S)

This application is based on and claims priority under 35 U.S.C. § 119 from Korean Patent Application No. 10-2018-0001853, filed on Jan. 5, 2018, in the Korean Intellectual Property Office, the disclosure of which is incorporated by reference herein in its entirety.

BACKGROUND

1. Field

Apparatuses consistent with exemplary embodiments relate to a holographic display device, and more particularly, to a holographic display device capable of reducing chromatic aberration.

2. Description of the Related Art

Holographic display methods, which are 3D image display methods which enable the depth perceived by the brain to be consistent with the focus of the eyes, and which provide full parallax, are being put to practical use.

According to a holographic display technique, reference light is irradiated onto a hologram pattern having recorded thereon an interference pattern obtained by interference between object light reflected from an original object and the reference light, the reference light is diffracted, and an image of the original object is reproduced thereby. According to a currently-commercialized holographic display technique, rather than using a hologram pattern obtained by directly exposing an original object to light, a computer-generated hologram (CGH) is provided as an electric signal to a spatial light modulator. Then, the spatial light modulator forms a hologram pattern according to the input CGH signal and diffracts reference light, thereby generating a 3D image.

In this holographic display technique, the 3D image generated by the spatial light modulator is focused on a predetermined space by a lens. Lenses used in this holographic display technique may be refractive lenses or diffractive lenses. A refractive lens generally has a large volume. Although a Fresnel lens having a relatively small thickness may be used, there is a limit at which concentric stripes, appearing at corners of the grooves in the Fresnel lens, are seen. A diffractive lens may be ultra-thin. However, since diffraction is highly dependent the wavelength of light, a serious chromatic aberration may occur.

SUMMARY

One or more exemplary embodiments may provide a holographic display device capable of reducing chromatic aberration even when a diffractive lens is used.

Additional exemplary aspects and advantages will be set forth in part in the description which follows and, in part, will be apparent from the description, or may be learned by practice of the presented exemplary embodiments.

In accordance with an aspect of an exemplary embodiment, a holographic display device includes a holographic display configured to reproduce a three-dimensional (3D) image; and a field lens configured to focus the 3D image reproduced by the holographic display, wherein the field lens includes an anisotropic diffractive lens configured to function as a lens with respect to at least one of a first polarization and a second polarization orthogonal to the first polarization.

The field lens may include a plurality of anisotropic diffractive lenses each configured to function as a lens with respect to at least one of the first polarization and the second polarization orthogonal to the first polarization, and a plurality of wavelength selective polarization modulation devices each arranged between two of the plurality of anisotropic diffractive lenses, wherein the field lens is configured to reduce chromatic aberration by a combination of the plurality of anisotropic diffractive lenses and the plurality of wavelength selective polarization modulation devices; and wherein the field lens further includes a polarization forming unit configured to polarize light incident thereon such that a first anisotropic diffractive lens of the plurality of anisotropic diffractive lenses functions as a lens with respect to at least one of a plurality of colors of light incident on the field lens.

The polarization forming unit may include a first wavelength selective polarization modulation device configured to change a polarization of the at least one of the plurality of colors of light incident on the field lens to a first polarization or a second polarization orthogonal to the first polarization.

Each of the plurality of wavelength selective polarization modulation devices may be configured to change a polarization of the at least one of the plurality of colors of light to another orthogonal polarization.

Each of the plurality of anisotropic diffractive lenses may be configured as a focusing lens with respect to a light having the first polarization and as a diverging lens with respect to a light having the second polarization orthogonal to the first polarization, wherein the light having the first polarization is emitted as light having the second polarization and the light having the second polarization is emitted as light having the first polarization.

One of the first polarization and the second polarization may be a right circular polarization and the other one may be a left circular polarization.

The plurality of anisotropic diffractive lenses may have different focal lengths.

Each of the plurality of anisotropic diffractive lenses may be configured to function as a diverging lens or a focusing lens according to a polarization of each of the plurality of colors of light.

The holographic display device may further include an additional wavelength selective polarization modulation device configured to equally modulate polarizations of a plurality of colors of light output via the plurality of anisotropic diffractive lenses.

The field lens may have a stacked structure in which the anisotropic diffractive lens and the wavelength selective polarization modulation device are alternately stacked and may further include a polarization converter configured to convert a polarization of an light on a rear side of the stacked structure.

The polarization converter may include quarter wave plate.

Each of the plurality of anisotropic diffractive lenses may be configured to function as a lens with respect to at least one of the plurality of colors of light having the first polarization, wherein the plurality of colors of light are m colors of light (wherein m is equal to or greater than 3) and wherein each of the plurality of wavelength selective polarization modulation devices is configured to selectively modulate a polarization of incident light according to wavelength such that m−1 or fewer colors of light, from among the m kinds of colors of light incident on an adjacent anisotropic diffractive lens have the first polarization and the remaining colors of light have the second polarization orthogonal to the first polarization.

The first polarization and the second polarization may respectively correspond to a first linear polarization and a second linear polarization orthogonal to the first linear polarization.

The plurality of colors of light may include first through third color light respectively having wavelengths of λ1, λ2, and λ3, wherein the plurality of anisotropic diffractive lenses include first through third anisotropic diffractive lenses, wherein the polarization forming unit includes a first wavelength selective polarization modulation device disposed in front of the first anisotropic diffractive lens such that a polarization of at least one of the first through third color light incident to the field lens is changed to the first polarization or the second polarization orthogonal to the first polarization, wherein the plurality of wavelength selective polarization modulation devices include: a second wavelength selective polarization modulation device disposed between the first and second anisotropic diffractive lenses; and a third wavelength selective polarization modulation device disposed between the second and third anisotropic diffractive lenses, wherein unique characteristic values c1, c2, and c3 are respectively products of a wavelength of light incident on the first through third anisotropic diffractive lenses and focal lengths of the lenses at the incident wavelength; total focal lengths of the first through third wavelength selective polarization modulation devices with respect to the first through third color light are $f_{total\_1}$, $f_{total\_2}$, and $f_{total\_3}$ respectively, modulation coefficients indicating modulation states of the first through third wavelength selective polarization modulation devices and the unique characteristic values c1, c2, and c3 of the first through third anisotropic diffractive lenses satisfy the same focal length $f=f_{total\_1}=f_{total\_2}=f_{total\_3}$ with respect to the first through third color lights having the wavelengths of $\lambda_1$, $\lambda_2$, and $\lambda_3$ so as to remove chromatic aberration as shown in the Equation below, $$\begin{pmatrix} 1/c_1 \\ 1/c_2 \\ 1/c_3 \end{pmatrix} = \frac{1}{f} \begin{bmatrix} m_{11} & m_{12} & m_{13} \\ m_{21} & m_{22} & m_{23} \\ m_{31} & m_{32} & m_{33} \end{bmatrix}^{-1} \begin{pmatrix} 1/\lambda_1 \\ 1/\lambda_2 \\ 1/\lambda_3 \end{pmatrix} \quad \text{[Equation]}$$

wherein $m_{ij}$ is a modulation coefficient indicating the modulation states of the first through third wavelength selective polarization modulation devices and functioning when a color light of an ith wavelength passes through a jth anisotropic diffractive lens.

One of the first polarization and the second polarization may be a right circular polarization and the other one may be a left circular polarization, wherein each of the first through third anisotropic diffractive lenses is configured as a focusing lens with respect to a light having the first polarization and as a diverging lens with respect to a light having the second polarization orthogonal to the first polarization, the light having the first polarization is emitted as light having the second polarization, and the light having the second polarization is emitted as light having the first polarization, wherein $m_{ij}$ is any one of +1, which enables the jth anisotropic diffractive lens to function as the focusing lens, and −1, which enables the jth anisotropic diffractive lens to function as the diverging lens with respect to the color light of the ith wavelength, and modulation coefficients of the first through third wavelength selective polarization modulation devices are determined such that an inverse function of a modulation matrix is satisfied.

The first polarization and the second polarization may correspond to a first linear polarization and a second linear polarization orthogonal to the first linear polarization, wherein each of the first through third anisotropic diffractive lenses is configured to function as a lens with respect to at least one of the first through third color light having the first polarization, wherein $m_{ij}$ is any one of 1, in which the jth anisotropic diffractive lens functions as a lens with respect to a color light of an ith wavelength, and 0, in which the jth anisotropic diffractive lens does not serve as the lens with respect to the color light of the ith wavelength, and modulation coefficients of the first through third wavelength selective polarization modulation devices are determined such that the inverse function of the modulation matrix is satisfied.

The anisotropic diffractive lens may be a liquid crystal lens comprising a liquid crystal array forming a geometrical phase arrangement to form a geometric phase lens.

The holographic display may include a backlight including a light source and a light guide plate configured to guide a light from the light source; and a spatial light modulator configured to diffract the light incident from the backlight to reproduce the 3D image.

The field lens may be disposed in front of the spatial light modulator or between the backlight and the spatial light modulator.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
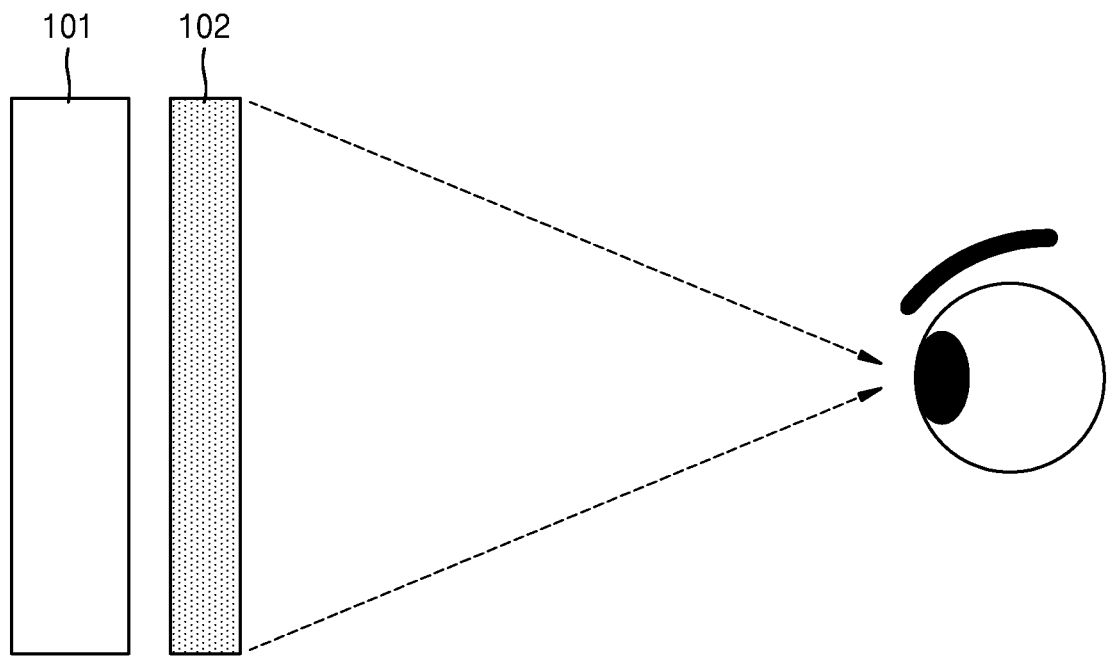
FIGS. 1 to 3 each schematically show a holographic display device capable of reducing chromatic aberration according to a respective exemplary embodiment.

Hereinafter, a holographic display device for reducing chromatic aberration is described in detail with reference to the accompanying drawings. In the drawings, like reference numerals denote like elements, and the sizes or thicknesses of components may be exaggerated for convenience of description. The exemplary embodiments described below are only illustrative, and various changes in form and details may be made therein.

FIG. 1 schematically shows a holographic display device capable of reducing chromatic aberration according to an exemplary embodiment.

Referring to FIG. 1, the holographic display device may include a holographic display 101, for reproducing a three-dimensional (3D) image, and a field lens 102 for focusing the 3D image reproduced by the holographic display 101 onto a predetermined space.

Figure 2:
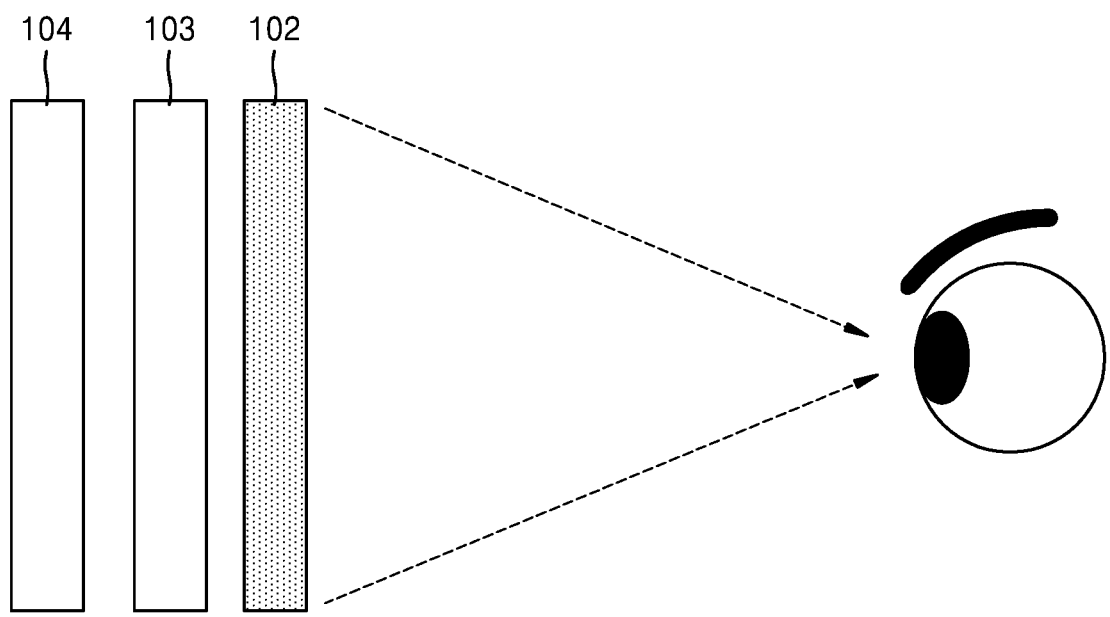
Figure 3:
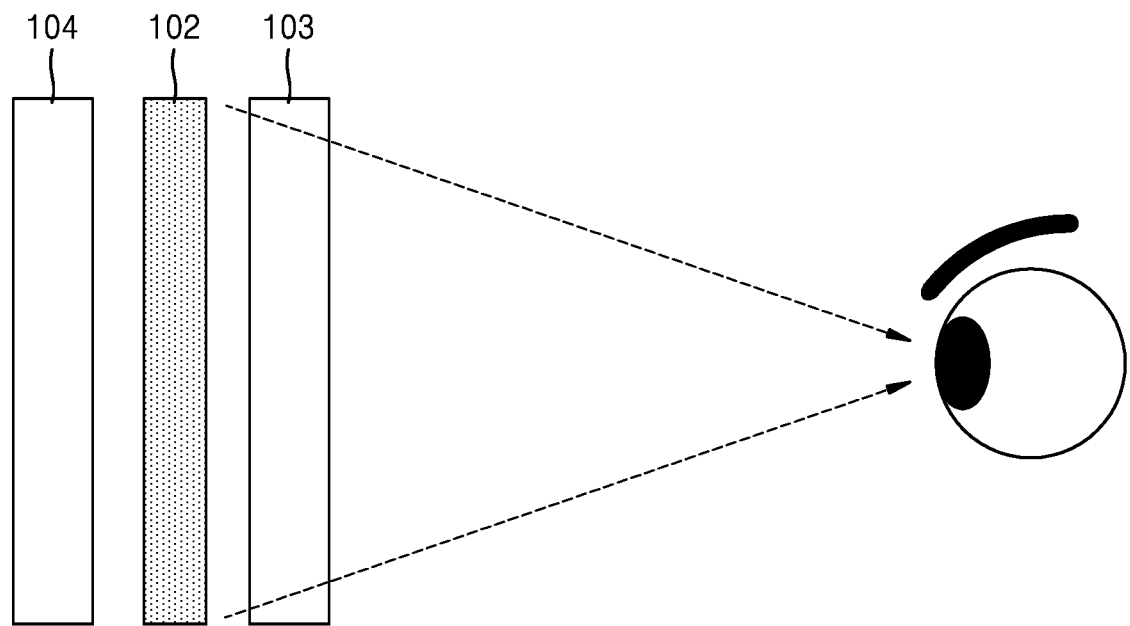

Referring to FIGS. 2 and 3, the holographic display 101 may include a backlight 104 and a spatial light modulator 103, for diffracting a light incident from the backlight 104 to reproduce the 3D image. The backlight 104 may include a light source and a light guide plate for guiding light from the light source. The light source may output coherent light. The light source may include a laser diode. When the light source emits light with a degree of spatial coherence, the light emitted by the light source and diffracted and modulated by the spatial light modulator 103 may have coherence. Any light source that emits a light with a degree of spatial coherence may be used as the light source. The light source may emit light of a plurality different colors (and therefore different wavelengths). The plurality of light may be m different colors, wherein m may be 3 or more. The light source may emit a first color light of a first wavelength band, a second color light of a second wavelength band different from the first wavelength band, and a third color light of a third wavelength band different from the first and second wavelength bands. The first, second, and third color light may be, according to an exemplary embodiment, red, green, and blue light, respectively.

The spatial light modulator 103 may form a hologram pattern having an interference pattern for modulating an incident light. The incident light may be diffracted and modulated by the hologram pattern formed on the spatial light modulator 103, and thus the 3D image, that is, the hologram image, may be reproduced at the predetermined spatial position.

As shown in FIG. 2, the field lens 102 may be disposed in front of the spatial light modulator 103. As shown in FIG. 3, the field lens 102 may be disposed between the back light 104 and the spatial light modulator 103.

The field lens 102 may include at least one anisotropic diffractive lens functioning as a lens with respect to at least one of light of a first polarization and light of a second polarization orthogonal to the first polarization. The anisotropic diffractive lens may be a geometric phase lens (a GP lens). For example, the anisotropic diffractive lens may be a liquid crystal lens that implements a geometric phase lens by forming a geometric phase array of a liquid crystal array.

Figure 4:
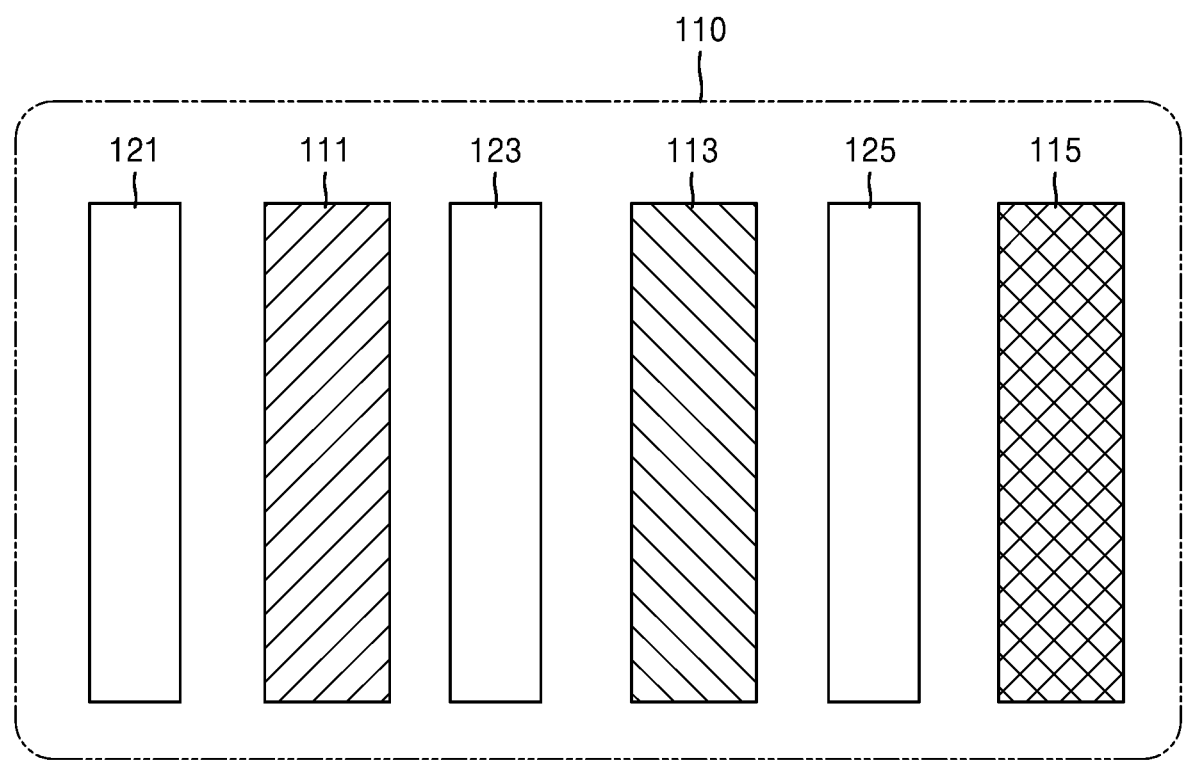
FIG. 4 schematically shows a field lens of a holographic display device of one of FIGS. 1 to 3, according to an exemplary embodiment.

FIG. 4 illustrates a field lens 110 that may be used in the holographic display device of any one of FIGS. 1 to 3, according to an exemplary embodiment.

Referring to FIG. 4, the field lens 110 may include a plurality of anisotropic diffractive lenses 111, 113, and 115 and a plurality of wavelength selective polarization modulation devices 123 and 125, each disposed between a pair of the plurality of anisotropic diffractive lenses 111, 113, and 115. The field lens 110 may reduce chromatic aberration when a 3D image is focused at the predetermined position using a combination of the plurality of anisotropic diffractive lenses 111, 113, and 115 and the plurality of wavelength selective polarization modulation devices 123 and 125. The plurality of anisotropic diffractive lenses 111, 113, and 115 may function as lenses with respect to at least one of light of a first polarization and light of a second polarization orthogonal to the first polarization. Each of the plurality of wavelength selective polarization modulation devices 123 and 125 may modulate the polarization of light, from one polarization to another orthogonal polarization, of light of at least one of a plurality of colors of incident light.

The field lens 110 may further include a polarization forming unit 121 that polarizes light transmitted therethrough such that a first anisotropic diffractive lens of the plurality of anisotropic diffractive lenses 111, 113, and 115 acts as a lens with respect to at least one color of incident light.

Each of the plurality of anisotropic diffractive lenses 111, 113, and 115 may function as a diverging lens or a focusing lens according to the polarization of the light incident thereon. Further, the plurality of anisotropic diffractive lenses 111, 113, and 115 may have different focal lengths. That is, each of the plurality of anisotropic diffractive lenses 111, 113, and 115 may function as a focusing lens with respect to light of the first polarization and may also function as a diverging lens with respect to light of the second polarization orthogonal to the first polarization. Each of the plurality of anisotropic diffractive lenses 111, 113, and 115 may be formed such that incident light of the first polarization may be emitted as light of the second polarization and incident light of the second polarization may be emitted as light of the first polarization. At this time, one of the first polarization and the second polarization may correspond to a right circular polarization and the other one may correspond to a left circular polarization.

Each of the plurality of anisotropic diffractive lenses 111, 113, and 115 may serve as a lens with respect to at least one color light having the first polarization, from among the plurality of color light, the plurality of color light may be m different colors (m is equal to or more than 3), and each of the plurality of wavelength selective polarization modulation devices 123 and 125 may selectively modulate the polarization of incident light according to wavelength of the incident light such that light of m−1 colors, of the light of m different colors incident on an adjacent anisotropic diffractive lens has the first polarization and the light of the remaining colors has the second polarization orthogonal to the first polarization. In this case, the first and second polarization may correspond to one linear polarization and another linear polarization orthogonal to the one linear polarization respectively.

When the light of the plurality of colors includes light of first through third color light having wavelengths of $\lambda_1$, $\lambda_2$, and $\lambda_3$ respectively, the plurality of anisotropic diffractive lenses 111, 113, and 115 may include first through third anisotropic diffractive lenses 111, 113 and 115, and the plurality of wavelength selective polarization modulating devices 123 and 125 may include a second wavelength selective polarization modulating device 123 disposed between the first and second anisotropic diffractive lenses 111 and 113, and a third wavelength selective polarization modulation device 125 disposed between the second and third diffractive lenses 113 and 115.

That is, the field lens 110 may include, for example, the first through third anisotropic diffractive lenses 111, 113 and 115, the second wavelength selective polarization modulation device 123 disposed between the first and second anisotropic diffractive lenses 111 and 113, and the third wavelength selective polarization modulation device 125 disposed between the second and third diffractive lenses 113 and 115. In this regard, the number of the anisotropic diffractive lenses and the number of the wavelength selective modulation devices may vary depending on design conditions.

At this time, the polarization forming unit 121 may polarize the light transmitted therethrough such that a firstly positioned anisotropic diffractive lens, that is, the first anisotropic diffractive lens 111 of the plurality of anisotropic diffractive lenses 111, 113, and 115, acts as a lens with respect to light of at least one of the plurality of colors of incident light.

The polarization forming unit 121 may be a first wavelength selective polarization modulation device that changes the polarization of incident light of at least one of the plurality of colors to the first polarization or to the second polarization orthogonal to the first polarization. In this regard, the first polarization and the second polarization may be linear polarizations or a circular polarizations. The polarization forming unit 121 may be provided at a front end of the first anisotropic diffractive lens 111 or at any position on an optical path of the backlight 104 and the first anisotropic diffractive lens 111. Hereinafter, for convenience, the polarization forming unit 121 may be described as the first wavelength selective polarization modulation device 121. Herein, the phrase "characteristic value" is used to refer to a product of a wavelength of light being focused by an optical element and the focal length of the optical element with respect to the light. Thus, when the unique characteristic values, corresponding to a product of the wavelengths of light incident on each of the first through third anisotropic diffractive lenses 111, 113, and 115 and the focal lengths of the different wavelengths, are c1, c2, and c3, respectively, and the total focal lengths of the first through third wavelength selective polarization modulation devices 121, 123 and 125 with respect to each of the first through third color light are $f_{total\_1}$, $f_{total\_2}$, and $f_{total\_3}$ respectively, modulation coefficients indicating modulation states of the first through third wavelength selective polarization modulation devices 121, 123 and 125 and the unique characteristic values c1, c2, and c3 of the first through third anisotropic diffractive lenses 111, 113, and 115 may be determined via Equation 1 below to satisfy the same focal length $f=f_{total\_1}=f_{total\_2}=f_{total\_3}$ with respect to the first through third color light having the wavelengths of $\lambda_1$, $\lambda_2$, and $\lambda_3$ so as to remove chromatic aberration.

$$\begin{pmatrix} 1/c_1 \\ 1/c_2 \\ 1/c_3 \end{pmatrix} = \frac{1}{f} \begin{bmatrix} m_{11} & m_{12} & m_{13} \\ m_{21} & m_{22} & m_{23} \\ m_{31} & m_{32} & m_{33} \end{bmatrix}^{-1} \begin{pmatrix} 1/\lambda_1 \\ 1/\lambda_2 \\ 1/\lambda_3 \end{pmatrix} \quad \text{[Equation 1]}$$

Here, $m_{ij}$ is a modulation coefficient indicating the modulation states of the first through third wavelength selective polarization modulation devices 121, 123 and 125 and functioning when light of an ith wavelength passes through a jth anisotropic diffractive lens.

For example, when one of the first polarization and the second polarization corresponds to the right circular polarization and the other one corresponds to the left circular polarization, each of the plurality of anisotropic diffractive lenses 111, 113, and 115 may function as the focusing lens with respect to the light of the first polarization and function as the diverging lens with respect to the light of the second polarization orthogonal to the first polarization. Each of the plurality of anisotropic diffractive lenses 111, 113, and 115 may be formed such that the light of the first polarization may be emitted as light of the second polarization and such that the light of the second polarization may be emitted as light of the first polarization. In this case, $m_{ij}$ is any one of +1 which allows the jth anisotropic diffractive lens to function as the focusing lens and −1 which allows the jth anisotropic diffractive lens to function as the diverging lens with respect to the light of the ith wavelength, and the modulation coefficients of the first through third wavelength selective polarization modulation devices 121, 123 and 125 may be determined such that an inverse function of a modulation matrix exists.

Further, when the first polarization and the second polarization correspond to one linear polarization and another linear polarization orthogonal to the one linear polarization, each of the first through third anisotropic diffractive lenses 111, 113, and 115 may function as the lens with respect to at least one of the first through third color light having the first polarization. In this case, $m_{ij}$ may be any one of 1 in which the jth anisotropic diffractive lens functions as a lens with respect to light of an ith wavelength and 0 in which the jth anisotropic diffractive lens does not serve as the lens with respect to the light of the ith wavelength, and the modulation coefficients of the first through third wavelength selective polarization modulation devices 121, 123 and 125 may be determined such that the inverse function of the modulation matrix exists.

Hereinafter, a process of obtaining Equation 1 will be described.

When a diffractive lens having a focal length of f with respect to a wavelength of $\lambda$ is designed, the diffractive lens has a characteristic value c as follows.

$$c=\lambda * f \quad \text{[Equation 2]}$$

The unique characteristic value c is maintained even when the wavelength of a light passing through the lens is changed, and thus, a focal length f′ of the lens with respect to another wavelength of $\lambda'$ is expressed as follows.

$$c=\lambda'* f' \quad \text{[Equation 3]}$$

The focal distance of a single diffractive lens varies with the wavelength of light, which may be a major cause of chromatic aberration occurring in the diffractive lens. To correct the chromatic aberration, a plurality of diffractive lenses may be used.

When three diffractive lenses are combined, the total focal distance $f_{total}$ may be expressed by the following equation.

$$1/f_{total}=1/f_1+1/f_2+1/f_3 \quad \text{[Equation 4]}$$

When characteristic values of the three diffractive lenses are c1, c2, and c3, respectively, Equation 5 is obtained by substituting Equation 2 into Equation 4.

$$1/f_{total}=\lambda*(1/c_1+1/c_2+1/c_3) \quad \text{[Equation 5]}$$

When the wavelength of the first color light is $\lambda_1$, the focal length with respect to the first color light may have the following relationship shown in Equation 6.

$$1/f_{total\_1}=\lambda_1*(1/c_1+1/c_2+1/c_3) \quad \text{[Equation 6]}$$

The wavelengths $\lambda_2$ and $\lambda_3$ of the second and third color lights may also satisfy the following relationship of Equation 7.

$$1/f_{total\_2}=\lambda_2*(1/c_1+1/c_2+1/c_3)$$

$$1/f_{total\_3}=\lambda_3*(1/c_1+1/c_2+1/c_3) \quad \text{[Equation 7]}$$

In this regard, $f_{total\_i}$ is the total focal length with respect to the ith wavelength.

When Equation 6 is divided by Equation 7, focuses are not identical with each other when wavelengths are different as follows.

$$f_{total\_1}/f_{total\_2}=\lambda_2/\lambda_1$$

$$f_{total\_2}/f_{total\_3}=\lambda_3/\lambda_2$$

$$f_{total\_3}/f_{total\_1}=\lambda_1/\lambda_3 \quad \text{[Equation 8]}$$

It may be seen from the above that the chromatic aberration may not be removed by using a method of arranging three diffractive lenses without any modulation.

Using a polarization dependent diffractive lens, the focal length may be modulated to either positive f or negative f or to not operate with a lens (infinity of focal length) according to a state of a polarization of the incident light.

When a coefficient indicating a modulation state is m, the following values may be obtained for three cases.

$$m=+1\text{(focal length}=+f)$$

$$m=-1\text{(focal length}=-f)$$

$$m=0\text{(focal length=infinity)} \quad \text{[Equation 9]}$$

When a wavelength selective polarization modulation device is used according to the state of the incident light, the modulation coefficient m may be freely changed independently of each wavelength. The focal length for the three diffractive lenses applied to enable polarization modulation may be expressed below.

$$1/f_{total}=\lambda*(m_1/c_1+m_2/c_2+m_3/c_3) \quad \text{[Equation 10]}$$

When polarization modulation is applied to all three wavelengths, it may be expressed as follows.

$$1/f_{total\_1}=\lambda_1*(m_{11}/c_1+m_{12}/c_2+m_{13}/c_3)$$

$$1/f_{total\_2}=\lambda_2*(m_{21}/c_1+m_{22}/c_2+m_{23}/c_3)$$

$$1/f_{total\_3}=\lambda_3*(m_{31}/c_1+m_{32}/c_2+m_{33}/c_3) \quad \text{[Equation 11]}$$

($m_{ij}$ is a modulation coefficient functioning when the ith wavelength passes through the jth diffractive lens)

This is expressed by the following matrix.

$$\begin{pmatrix} \frac{1}{f_{total1}} \\ \lambda_1 \\ \frac{1}{f_{total2}} \\ \lambda_2 \\ \frac{1}{f_{total3}} \\ \lambda_3 \end{pmatrix} = \begin{bmatrix} m_{11} & m_{12} & m_{13} \\ m_{21} & m_{22} & m_{23} \\ m_{31} & m_{32} & m_{33} \end{bmatrix} \begin{pmatrix} \frac{1}{c_1} \\ \frac{1}{c_2} \\ \frac{1}{c_3} \end{pmatrix} \quad \text{[Equation 12]}$$

The removal of the chromatic aberration may be a problem of finding the diffractive lenses $c_1$, $c_2$, and $c_3$ satisfying the same focal length ($f=f_{total\_1}=f_{total\_2}=f_{total\_3}$) with respect to the given wavelengths $\lambda 1$, $\lambda 2$, and $\lambda 3$ and may be mathematically the same problem as finding an inverse function of the matrix M of Equation 13 expressed by the modulation coefficient of Equation 12.

$$M = \begin{bmatrix} m_{11} & m_{12} & m_{13} \\ m_{21} & m_{22} & m_{23} \\ m_{31} & m_{32} & m_{33} \end{bmatrix} \quad \text{[Equation 13]}$$

When the unique characteristic values c1, c2, and c3 of the first through third anisotropic diffractive lenses 111, 113, and 115 satisfy the same focal length $f=f_{total\_1}=f_{total\_2}=f_{total\_3}$ with respect to the first through third color light having the wavelengths $\lambda 1$, $\lambda 2$, and $\lambda 3$, to remove the chromatic aberration, Equation 12 may be expressed as Equation 14.

$$\begin{pmatrix} 1/c_1 \\ 1/c_2 \\ 1/c_3 \end{pmatrix} = \frac{1}{f} \begin{bmatrix} m_{11} & m_{12} & m_{13} \\ m_{21} & m_{22} & m_{23} \\ m_{31} & m_{32} & m_{33} \end{bmatrix}^{-1} \begin{pmatrix} 1/\lambda_1 \\ 1/\lambda_2 \\ 1/\lambda_3 \end{pmatrix} \quad \text{[Equation 14]}$$

That is, the chromatic aberration of the diffractive lens may be removed by a combination of wavelength selective polarization modulation devices that allow the inverse function of the modulation matrix M to exist in Equation 14. This condition may be expressed mathematically as any case where det (M)≠0.

Hereinafter, a specific embodiment of the field lens 110 capable of removing chromatic aberration of a diffractive lens by a combination of wavelength selective polarization modulation devices will be described.

According to an exemplary embodiment, the field lens 110 may be configured such that the first through third anisotropic diffractive lenses 111, 113, and 115 function as focusing lenses only for the first through third color light respectively, in order to focus the first through third color light to the same focusing position. The first through third color light may be different colors. For example, any one of the first through third color light may be red, another one may be green, and the remaining one may be blue. Thus, the light of the first through third colors may be, for example, red light, green light, and blue light, respectively.

For example, the first anisotropic diffractive lens 111 may function as a lens with respect to the first color light of the first polarization to focus the first color light to a predetermined position. The second anisotropic diffractive lens 113 may function as a lens with respect to the second color light of the first polarization to focus the second color light to a predetermined position. The third anisotropic diffractive lens 115 may function as a lens with respect to the third color light of the first polarization to focus the third color light to the predetermined position. To this end, when the first through third anisotropic diffractive lenses 111, 113 and 115 are arranged in this order from an incident side, and focal lengths of the first through third anisotropic diffractive lenses 111, 113 and 115 are f1, f2, and f3, respectively, a relationship of f1>f2>f3 may be satisfied.

Considering the case in which the first through third anisotropic diffractive lenses 111, 113 and 115 are arranged in this order from an incident side, in order for the first anisotropic diffractive lens 111 to function as the lens with respect to the first color light of the first polarization, the first color light of the light incident on the field lens 110 must have the first polarization and the second color light and the third color light must have the second polarization orthogonal to the first polarization. In order for the second anisotropic diffractive lens 113 to function as the lens with respect to the second color light of the first polarization, the first color light and the third color light incident on the second anisotropic diffractive lens 113 must have the second polarization orthogonal to the first polarization. Also, in order for the third anisotropic diffractive lens 115 to function as the lens with respect to the third color light of the first polarization, the first color light and the second color light incident on the third anisotropic diffractive lens 115 must have the second polarization orthogonal to the first polarization.

To this end, the polarization forming unit 121, that is, the first wavelength selective polarization modulation device 121, may polarize light transmitted therethrough such that the transmitted first color light has the first polarization and the transmitted second and third color light have the second polarization. Instead of disposing the polarization forming unit 121, that is, the first wavelength selective polarization modulation device 121, at a front end of the first anisotropic diffractive lens 111, the backlight 104 itself may emit the first color light of the first polarization and emit the second and third colors of light having the second polarization.

The second wavelength selective polarization modulation device 123 may selectively modulate the polarization of light transmitted therethrough, according to a wavelength, such that the second color light incident on the second anisotropic diffractive lens 113 has the first polarization and the first and third color light incident on the second anisotropic diffractive lens 113 have the second polarization orthogonal to the first polarization. The third wavelength selective polarization modulation device 125 may selectively modulate the polarization of light transmitted therethrough, according to the wavelength, such that the third color light incident on the third anisotropic diffractive lens 115 has the first polarization and the first and second color light incident on the third anisotropic diffractive lens 115 have the second polarization. The second and third wavelength selective polarization modulation devices 123 and 125 may be retarders. In this regard, the first polarization and the second polarization may correspond to one linear polarization and another linear polarization orthogonal to the one linear polarization respectively. Alternately, the first polarization and the second polarization may correspond to one circular polarization and another circular polarization orthogonal to the one circular polarization respectively. For example, the first polarization may be a right circular polarization and the second polarization may be a left circular polarization.

Figure 5:
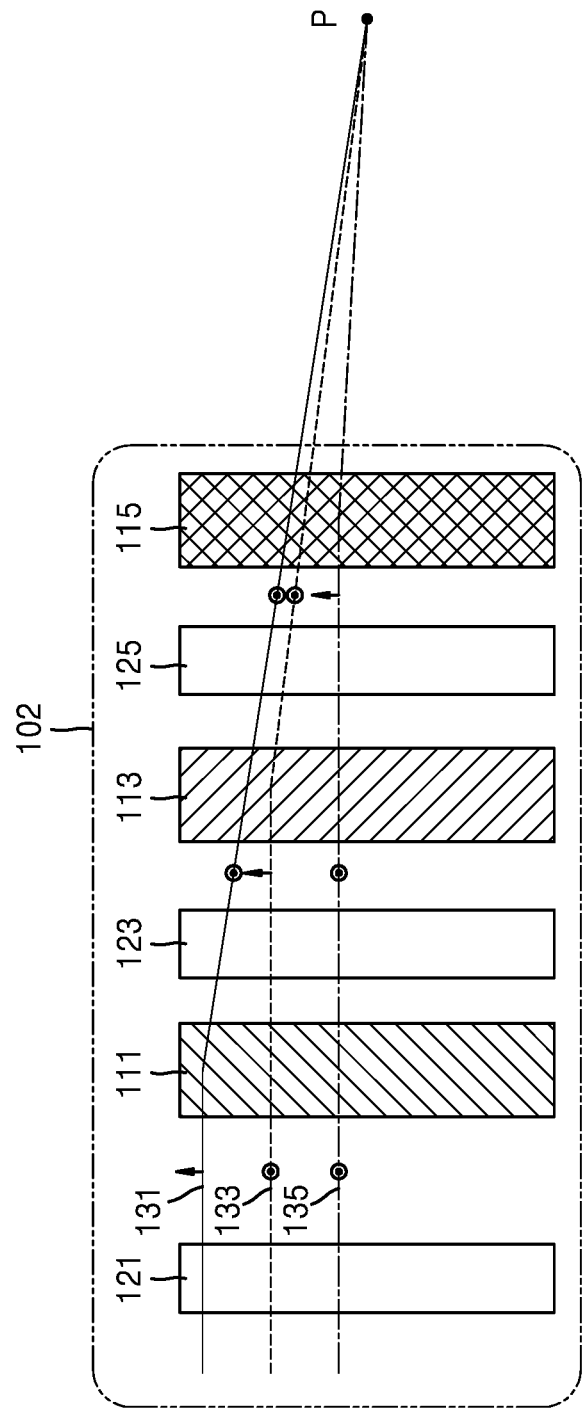
FIG. 5 shows a light path for a polarization change and chromatic aberration reduction focusing of first through third color light in a field lens when a first polarization is a linear polarization, e.g., a p polarization, according to an exemplary embodiment.

FIG. 5 shows an exemplarily light path for a polarization change and chromatic aberration reduction focusing of the first through third color light 131, 133, and 135 in the field lens 110 when a first polarization is a linear polarization, e.g. a p polarization.

Referring to FIG. 5, when the first polarization in which the first through third anisotropic diffractive lenses 111, 113 and 115 function as lens is a linear polarization, e.g. the p polarization, for example, the first color light 131 may be incident on the first anisotropic diffractive lens 111 in the first polarization, e.g., a p polarization state, and the second and third color light 133 and 135 may be incident on the first anisotropic diffractive lens 111 in a second polarization orthogonal to the first polarization, e.g., a s polarization state.

To this end, the polarization forming unit 121 may transmit light such that the first color light 131 has the first polarization, e.g., the p polarization state, and the second and third color light 133 and 135 have the second polarization, e.g., the s polarization state.

The first color light 131 is converged by the first anisotropic diffractive lens 111 and is finally focused on a predetermined position P. On the other hand, since the first anisotropic diffractive lens 111 does not function as a lens with respect to the second and third color light 133 and 135, the second and third color light 133 and 135 pass through the first anisotropic diffractive lens 111.

With respect to the first through third color light 131, 133 and 135 which have passed through the first anisotropic diffractive lens 111, the second wavelength selective polarization modulation device 123 may change the polarization of the first and second color light 131 and 133 to another orthogonal polarization and allow the third color light 135 to pass through as it is without a change of polarization. Accordingly, since the second color light 133 is in the first polarization, e.g. in the p polarization state, the second color light 133 is converged by the second anisotropic diffractive lens 113 and is focused on the predetermined position P. Since the first and third color light 131 and 135 are in the second polarization, for example, in the s polarization state, the second anisotropic diffractive lens 113 does not function as the lens with respect to the first and third color light 131 and 135, and may allow the first and third color light 131 and 135 to pass through as it is.

With respect to the first through third color light 131, 133 and 135 which have passed through the second anisotropic diffractive lens 113, the third wavelength selective polarization modulation device 125 may change the polarization of the second and third color light 133 and 135 to another orthogonal polarization and allow the first color light 131 to pass through as it is without a change of polarization. Accordingly, since the third color light 135 is in the first polarization, e.g. in the p polarization state, the third color light 135 is converged by the third anisotropic diffractive lens 115 and is finally focused on the predetermined position P. Since the first and second color light 131 and 133 are in the second polarization, for example, in the s polarization state, the third anisotropic diffractive lens 115 does not function as the lens with respect to the first and second color light 131 and 133, and may allow the first and second color light 131 and 133 to pass through as it is.

As described above, the first anisotropic diffractive lens 111 may function as the lens with respect to the first color light 131 of the first polarization to focus the first color light 131 on the focusing position P. The second anisotropic diffractive lens 113 may function as the lens with respect to the second color light 133 of the first polarization to focus the second color light 133 on the focusing position P. The third anisotropic diffractive lens 115 may function as the lens with respect to the third color light 135 of the first polarization to focus the third color light 135 on the focusing position P.

As described above, in order for each of the first through third anisotropic diffractive lenses 111, 113, and 115 to function as a lens only with respect to the first through third color light 131, 133, and 135 of the first polarization respectively, by using the first through third wavelength selective polarization modulation devices 121, 123 and 125, in a case in which each of the first through third color light 131, 133, and 135 has the first polarization only when the first through third color light 131, 133, and 135 are respectively incident on the first through third anisotropic diffractive lenses 111, 113, and 115, the first through third color light 131, 133, and 135 may be focused on the same focusing position P. In this regard, the effective focal length f1 of the first anisotropic diffractive lens 111 with respect to the first color light 131 may correspond to an optical distance from the first anisotropic diffractive lens 111 to the focusing position P. The effective focal length f2 of the second anisotropic diffractive lens 113 with respect to the second color light 133 may correspond to an optical distance from the second anisotropic diffractive lens 113 to the focusing position P. The effective focal length f3 of the third anisotropic diffractive lens 115 with respect to the third color light 135 may correspond to an optical distance from the third anisotropic diffractive lens 115 to the focusing position P.

The effective focal lengths f1, f2, and f3 of the first through third anisotropic diffractive lenses 111, 113, and 115 may thus satisfy a relationship of f1>f2>f3.

As described above, according to the field lens 110 including the first through third anisotropic diffractive lenses 111, 113 and 115, and the first through third wavelength selective polarization modulation devices 121, 123 and 125, the first through third color light 131, 133, and 135 may be focused on the same position. Thus, a 3D image with reduced chromatic aberration may be formed despite using a diffractive lens.

In the above description, a specific exemplary embodiment in which the field lens 110 is configured in which a plurality of anisotropic diffractive lenses, for example, each of the first through third anisotropic diffractive lenses 111, 113, and 115 functions as a lens with respect to different color light has been described, but the embodiment is not limited thereto, and various other embodiments are possible.

As described with reference to FIG. 6 below, the field lens 110 may be configured that each of the plurality of anisotropic diffractive lenses 111, 113, and 115 that form the field lens 110 functions as lenses with respect to a plurality of color light and the plurality of color light are focused on the same position as a result of a convergence and divergence combination in each of the plurality of anisotropic diffractive lenses 111, 113, and 115 to form a 3D image with reduced chromatic aberration.

Figure 6:
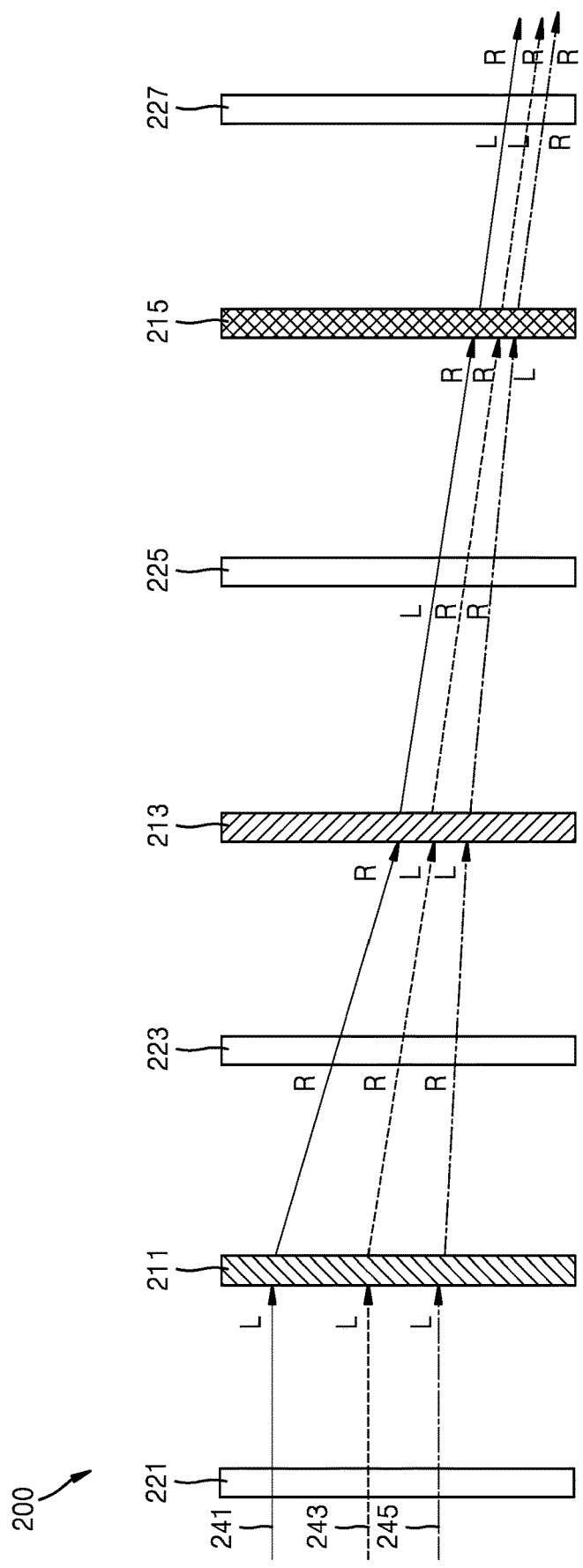
FIG. 6 schematically shows a field lens according to an exemplary embodiment.

FIG. 6 schematically shows an exemplary embodiment of a field lens 200.

Referring to FIG. 6, the field lens 200 includes first through third anisotropic diffractive lenses 211, 213 and 215, a second wavelength selective polarization modulation device 223 disposed between the first and second anisotropic diffractive lenses 211 and 213, and a third wavelength selective polarization modulation device 225 disposed between the second and third anisotropic diffractive lenses 213 and 215. The field lens 200 may further include a polarization forming unit 221, for example, a first wavelength selective polarization modulation device 221, in an input side. The field lens 200 may further include a fourth wavelength selective polarization modulation device 227 in an output side.

When first through third color light 241, 243 and 245 of the same polarization are incident on the first anisotropic diffractive lens 211, the field lens 200 of the present exemplary embodiment may reduce chromatic aberration by a combination of the first through third anisotropic diffractive lenses 211, 213 and 215 and the second and third wavelength selective polarization modulation devices 223 and 225. To this end, the first wavelength selective polarization modulation device 221 may output the first through third color light 241, 243, and 245 with the same polarization. The first through third anisotropic diffractive lenses 211, 213 and 215 may function as focusing lenses with respect to a light of a first polarization and function as diverging lenses with respect to a light of a second polarization orthogonal to the first polarization. The first through third anisotropic diffractive lenses 211, 213 and 215 may be configured such that incident light of the first polarization may be emitted as the second polarization and incident light of the second polarization may be emitted as the first polarization. In the present exemplary embodiment, one of the first polarization and the second polarization may correspond to a right circular polarization and the other one may correspond to a left circular polarization.

The first through third anisotropic diffractive lenses 211, 213, and 215 may have different focal lengths. The first through third anisotropic diffractive lenses 211, 213, and 215 may function as focusing lenses or diverging lenses according to the polarization of the light of the first through third color light 241, 243, and 245 respectively.

For example, each of the first through third anisotropic diffractive lenses 211, 213, and 215 may function as the focusing lens with respect to the first through third color light 241, 243, and 245 of the first polarization, e.g. the right circular polarization, and may function as the diverging lens with respect to the first through third color light 241, 243, and 245 of the orthogonal second polarization, e.g. the left circular polarization.

At this time, since a diffractive lens has a characteristic that satisfies a relation equation $\lambda f = c$ (where $\lambda$ is a wavelength, $f$ is a focal length, and $c$ is a constant), each of the first through third anisotropic diffractive lenses 211, 213, and 215 may be configured that a color light having the shortest wavelength among the first through third color light 241, 243, and 245 has the longest focal length, and a color light having the longest wavelength has the shortest focal length.

Figure 7A:
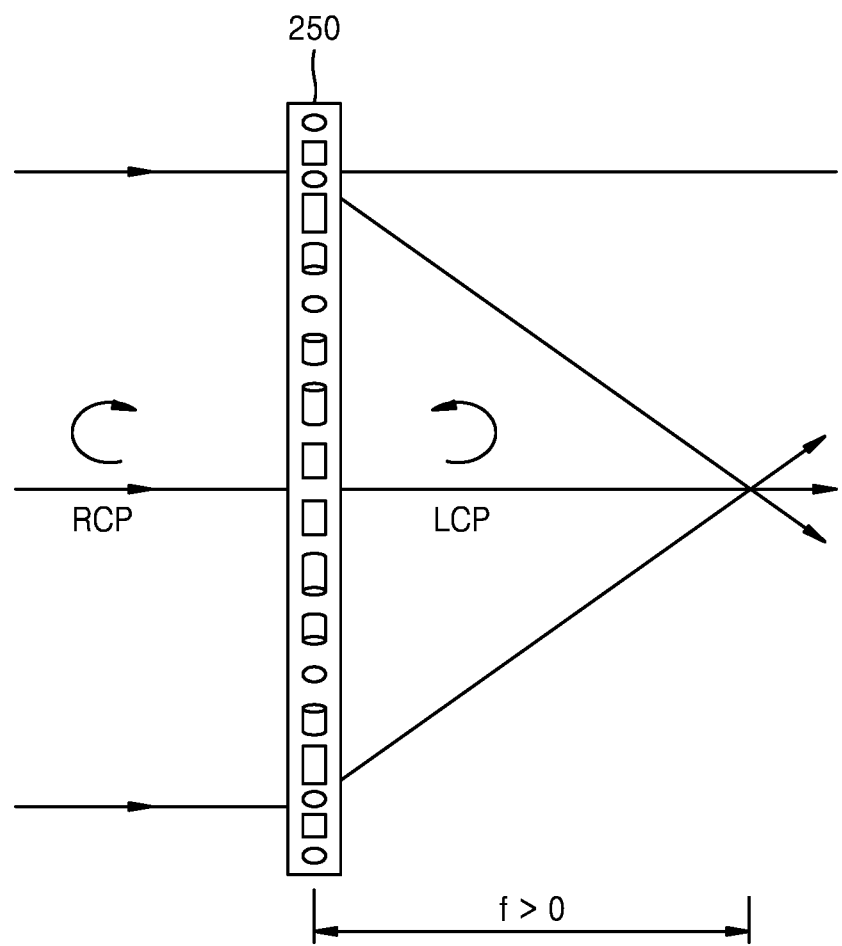
FIGS. 7A and 7B are diagrams showing convergence, divergence, and polarization changes according to a polarization of incident light in an anisotropic diffractive lens used as the first through third anisotropic diffractive lenses of FIG. 6, according to an exemplary embodiment.
Figure 7B:
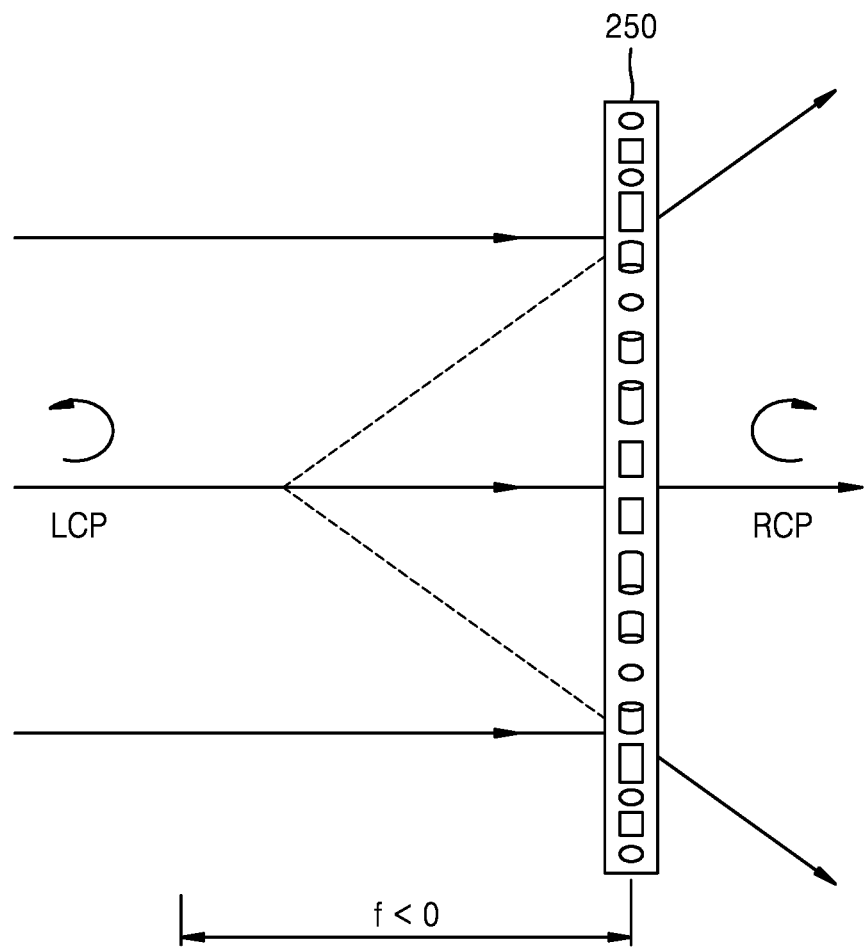

FIGS. 7A and 7B are diagrams showing convergence, divergence and polarization changes according to a polarization of incident light in an anisotropic diffractive lens 250 that may be applied to the first through third anisotropic diffractive lenses 211, 213, and 215 of FIG. 6.

Referring to FIG. 7A, the anisotropic diffractive lens 250 may function as a focusing lens when light of a right circular polarization RCP is incident to focus the light on a focus and convert the light of the right circular polarization RCP into a light of a left circular polarization LCP.

In contrast, referring to FIG. 7B, the anisotropic diffractive lens 250 may function as a diverging lens when the light of the left circular polarization LCP is incident to diverge the light and convert the light of the left circular polarization LCP into the light of the right circular polarization RCP.

Figure 8:
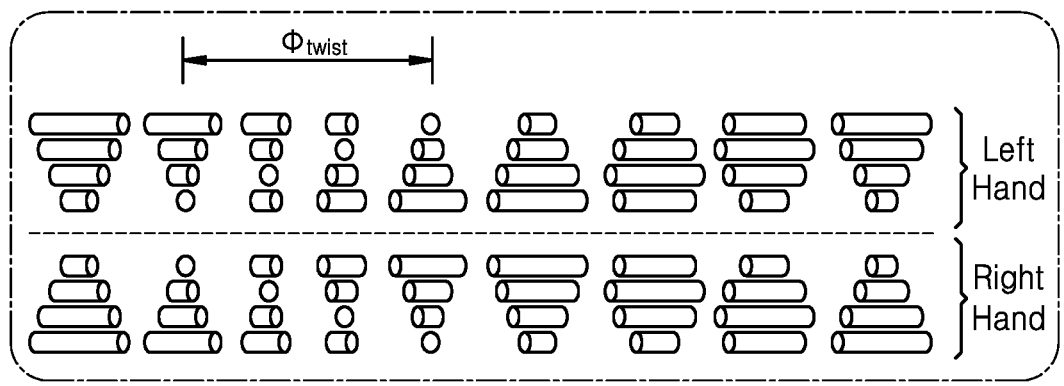
FIG. 8 shows a diffraction structure using a periodic liquid crystal orientation of an anisotropic diffractive lens functioning as a converging lens with respect to light having a right circular polarization and functioning as a diverging lens with respect to light having a left circular polarization, according to an exemplary embodiment.

As described above, the anisotropic diffractive lens 250 functioning as a converging lens with respect to the light of the right circular polarization RCP and functioning as the diverging lens with respect to the light of the left circular polarization LCP may be implemented by as a diffraction structure using a periodic liquid crystal orientation as shown in FIG. 8.

At this time, an orientation pattern of the anisotropic diffractive lens 250 may form a concentric circular pattern.

When focal lengths of the first through third anisotropic diffractive lenses 211, 213 and 215 are f1, f2 and f3 respectively, the first through third anisotropic diffractive lenses 211, 213 and 215 may satisfy a relation of f2>f1>f3. For example, the first through third anisotropic diffractive lenses 211, 213 and 215 may be formed such that f1 has a focal length of about 6.672 m, f2 has a focal length of about 19.051 m, and f3 has a focal length of about 1.041 m. The focal length relationship of the first through third anisotropic diffractive lenses 211, 213, and 215 may change.

Referring again to FIG. 6, according to the field lens 200 according to the present exemplary embodiment, when the first through third color light 241, 243 and 245 of the same polarization formed by the polarization forming unit 221, i.e. the first wavelength selective polarization modulation device 221, are incident on the first anisotropic diffractive lens 211, in order to reduce chromatic aberration by a combination of the first through third anisotropic diffractive lenses 211, 213 and 215 and the second and third wavelength selective polarization modulation devices 223 and 225, the polarization of the first through third color light 241, 243 and 245 may be selectively modulated by the second and third wavelength selective polarization modulation devices 223 and 225, and thus convergence and divergence in the second and third anisotropic diffractive lenses 213 and 215 of the first through third color light 241, 243 and 245 may be adjusted, thereby focusing the first through third color light 241, 243 and 245 on the same focusing position.

To this end, the second wavelength selective polarization modulation device 223 may modulate a polarization of at least one of the first through third color light 241, 243, and 245 which have passed through the first anisotropic diffractive lens 211 into another orthogonal polarization, and the third wavelength selective polarization modulation device 225 may modulate a polarization of at least one of the first through third color light 241, 243, and 245 which have passed through the second anisotropic diffractive lens 213 to another orthogonal polarization.

In FIG. 6, when the polarization of the first through third color lights 241, 243, 245 incident on the first anisotropic diffractive lens 211 is a left circular polarization L, an optical path and a polarization change for the chromatic aberration reduction focusing by the combination of the first through third anisotropic diffractive lenses 211, 213, and 215 and the second and third wavelength selective polarization modulation devices 223 and 225 are exemplarily illustrated.

Referring to FIG. 6, for example, the first through third color light 241, 243, and 245 incident on the first anisotropic diffractive lens 211 in a left circular polarization L state may be changed to a right circular polarization R while passing through the first anisotropic diffractive lens 211. At this time, the first anisotropic diffractive lens 211 acts as a diverging lens with respect to the first through third color lights 241, 243, and 245, and has a different degree of divergence depending on a wavelength difference.

The second wavelength selective polarization modulation device 223 may modulate the right circular polarization R of the second and third color light 243 and 245 of the first through third color light 241, 243, and 245 that have passed through the first anisotropic diffractive lens 211 into the left circular polarization L and maintain the first color light 241 in a right circular polarization R state. Thus, the first color light 241 of the right circular polarization R and the second and third color light 243 and 245 of the left circular polarization L may be incident on the second anisotropic diffractive lens 213.

The second anisotropic diffractive lens 213 functions as the converging lens with respect to the first color light 241 of the right circular polarization R and the first color light 241 becomes the light of the left circular polarization L. The second anisotropic diffractive lens 213 functions as a diverging lens with different diverging angles with respect to the second and third color light 243 and 245 of the left circular polarization L, and the second and third color light 243 and 245 become light of the right circular polarization R.

The third wavelength selective polarization modulation device 225 may modulate the left circular polarization L of the first color light 241 and the right circular polarization R of the third color light 245 that have passed through the second anisotropic diffractive lens 213 into the right circular polarization R and the left circular polarization L respectively and maintain the second color light 243 in the right circular polarization R state. Thus, the first and the second color light 241 and 243 of the right circular polarization R and the third color light 245 of the left circular polarization L may be incident on the third anisotropic diffractive lens 215.

The third anisotropic diffractive lens 215 acts as the converging lens with respect to the first and second color light 241 and 243 of the right circular polarization R and the first and second color light 241 and 243 become the lights of the left circular polarization L. The third anisotropic diffractive lens 215 functions as the diverging lens with respect to the third color light 245 of the left circular polarization L and the third color light 245 becomes the light of the right circular polarization R.

On the other hand, when the field lens 200 further includes a fourth wavelength selective polarization modulation device 227 in the output side, the fourth wavelength selective polarization modulation device 227 may modulate the left circular polarization L of the first and second color light 241 and 243 into the right circular polarization R and maintain the third color light 245 in the right circular polarization R state. Thus, the first through third color light 241, 243, and 245 in the right circular polarization R state may be output and focused on the same focusing position in the field lens 200.

As described above, according to the field lens 200 including the first through third anisotropic diffractive lenses 211, 213, 215, the polarization forming unit 221, and the second and third wavelength selective polarization modulation devices 223 and 225, the first through third color light 241, 243, and 245 may be focused on the same position, thereby forming a 3D image with reduced chromatic aberration.

Figure 9:
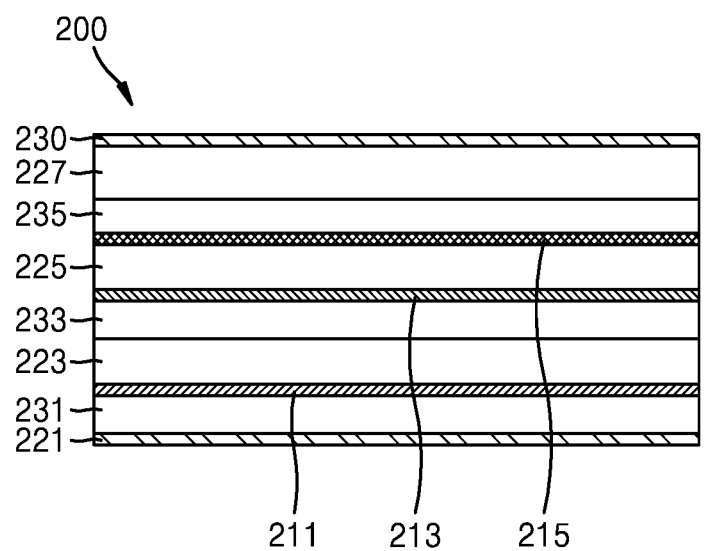
FIG. 9 shows a field lens of FIG. 6 having a stacked structure according to an exemplary embodiment.

FIG. 9 shows an example in which the field lens 200 of FIG. 6 is formed in a stacked structure.

Referring to FIG. 9, the first wavelength selective polarization modulation device 221, the first anisotropic diffractive lens 211, the second wavelength selective polarization modulation device 223, the second anisotropic diffraction device 213, the third wavelength selective polarization modulation device 225, the third anisotropic diffractive lens 215, and the fourth wavelength selective polarization modulation device 227 included in the field lens 200 may have the stacked structure. The first wavelength selective polarization modulation device 221 may be provided in a front side of the field lens 200. The field lens 200 may further include a polarization converter 230 for converting a polarization of an incident light in a rear side of the stacked structure. The polarization converter 230 may include a quarter wave plate. The first wavelength selective polarization modulation device 221 may convert, for example, the first through third color light 241, 243, and 245 of an incident linear polarization into, for example, the left circular polarization L. The polarization converter 230 may convert, for example, light of the right circular polarization R input from the fourth wavelength selective polarization modulation device 227 of the field lens 200 into linearly polarized light.

In the case in which the first wavelength selective polarization modulation device 221 and the polarization converter 230 are arranged in the front side and the rear side of the stacked structure of the field lens 200, the first through third color light 241, 243, and 245 may be in, for example, a linearly polarized state on a light path of the holographic display 101 except for the field lens 200.

On the other hand, FIG. 9 shows an example case in which spacer layers 231, 233 and 235 are respectively disposed between the first wavelength selective polarization modulation device 221 and the first anisotropic diffractive lens 211, between the second wavelength selective polarization modulation device 223 and the second anisotropic diffractive lens 213, and between the third anisotropic diffractive lens 215 and the fourth wavelength selective polarization modulation device 227. Positions, number, thicknesses, and the like of the spacer layers 231, 233 and 235 may be variously modified according to the optical design of the field lens 200.

It is exemplarily described with reference to FIGS. 6 through 9 above that the first through third anisotropic diffractive lenses 211, 213, and 215 of the field lens 200 function as, for example, focusing lenses with respect to the right circular polarization R and as diverging lenses with respect to the left circular polarization L, and chromatic aberration may be reduced by a combination of the first through third anisotropic diffractive lenses 211, 213, 215 and the second and third wavelength selective polarization modulation devices 223 and 225 when a 3D image is focused, but the exemplary embodiment is not limited thereto. The number of anisotropic diffractive lenses and the design of wavelength selective polarization modulation devices may be variously changed.

Figure 10:
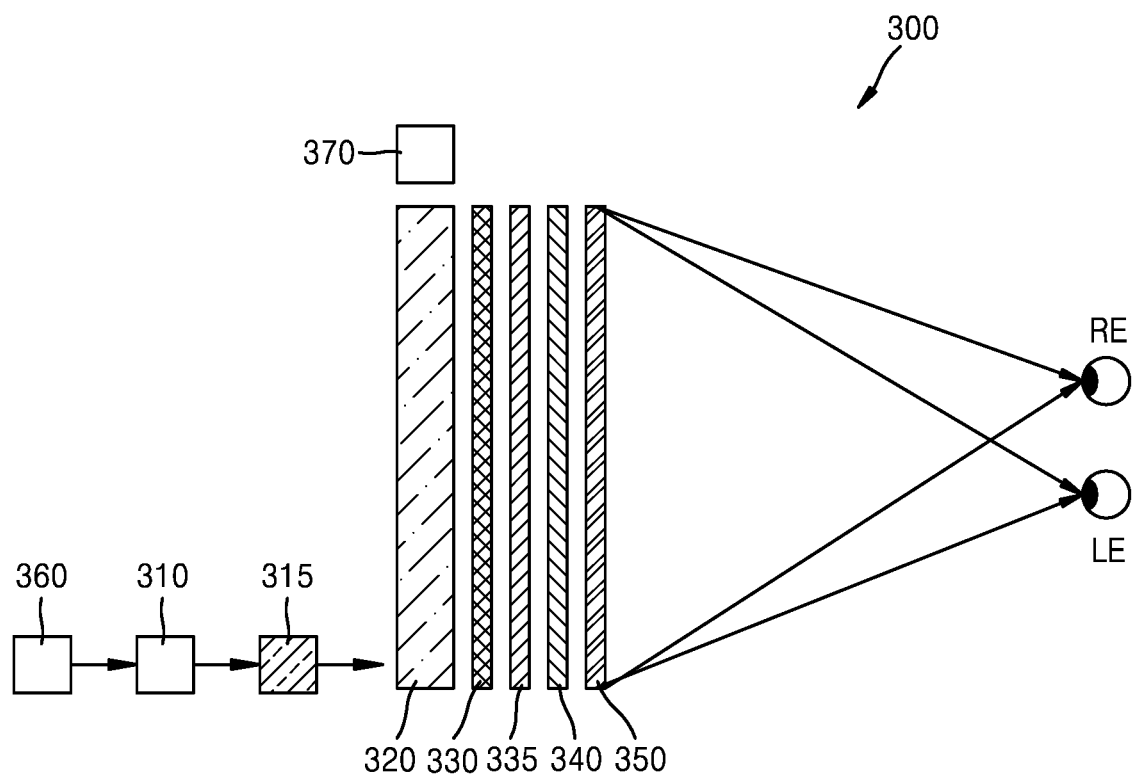
FIG. 10 schematically shows a holographic display device according to another exemplary embodiment.

FIG. 10 schematically shows a holographic display device 300 according to another exemplary embodiment.

The holographic display device 300 may include a backlight and spatial light modulator 350 that constitute a holographic display, and a field lens 340 located between the backlight and the spatial light modulator 350. The backlight may include a light source 310 for providing a light, and a light guide plate 320 for guiding the light from the light source 310. The light source 310 may provide a coherent light beam. The light source 310 may include a laser diode. However, if light has a degree of spatial coherence, the light diffracted and modulated by the spatial light modulator 350 may have coherence. Therefore, even when the light source 310 emits light with a degree of spatial coherence, another light source also may be used. The light source 310 may emit a plurality of colors of different wavelengths. For example, the light source 310 may emit a first color light of a first wavelength band, a second color light of a second wavelength band different from the first wavelength, and a third color light of a third wavelength band different from the first and second wavelength bands. The first, second, and third color light may be, for example, red, green, and blue light, respectively. The spatial light modulator 350 diffracts the light from the light guide plate 320 to reproduce a hologram image.

The field lens 340 focuses the hologram image reproduced by the spatial light modulator 350 on a predetermined space. FIG. 10 illustrates a case in which the field lens 340 is positioned between the light guide plate 320 of the backlight and the spatial light modulator 350. The field lens 340 may be disposed in a front side of the spatial light modulator 350.

Meanwhile, the holographic display device 300 according to an exemplary embodiment may further include first and second beam steerers 330 and 335 for two-dimensionally controlling a traveling direction of the light emitted from the light guide plate 320. The first and second beam steerers 330 and 335 may control a position of a light beam output according to a position of a viewer's pupil. For example, the first beam steerer 330 may adjust a lateral position of the light beam, and the second beam steerer 335 may adjust a longitudinal position of the light beam. The first and second beam steerers 330 and 335 may be implemented as, for example, a liquid crystal layer or an electrowetting device. In this regard, the first and second beam steerers 330 and 335 are illustrated as being positioned between the light guide plate 320 and the spatial light modulator 350. The first and second beam steerers 330 and 335 may be positioned between the light source 310 and an input end of the light guide plate 320.

A beam expander 315 may be further provided between the light source 310 and the light guide plate 320. The beam expander 315 may expand the light beam primarily by collimating point light from the light source 310. The beam expander 315 may include, for example, a collimating lens. A divergence angle of the light beam is made closer to 0 degree by collimating the light beam, and thus the coherence of the light may be increased. Therefore, the light beam may be collimated by the beam expander 315, and thus a quality of the holographic image may be enhanced.

The holographic display device 300 may further include an eye tracking sensor 370 for recognizing a position of a viewer and may further include a controller 360 for controlling the first and second beam steerers 330 and 335 according to a position sensed by the eye tracking sensor 370. The eye tracking sensor 370 may include an infrared camera, a visible light camera, or any of various other sensors.

The controller 360 may also control driving of the light source 310. For example, the controller 360 may control an irradiation direction of the light beam sequentially so that the hologram image is sequentially formed on left and right eyes of the viewer.

The holographic display device 300 according to the present exemplary embodiment may provide hologram images having different viewpoints to a left eye LE and a right eye RE of an observer in a binocular hologram manner. For example, the holographic display device 300 may provide a left eye hologram image to a left eye LE view zone of the observer and a right eye hologram image, having different viewpoint from the left eye hologram image, to a right eye RE view zone of the observer. Unlike a left-eye image and a right-eye image of a stereoscopic method, the left eye hologram image and the right eye hologram image provided by the holographic display device 300 may provide stereoscopic effects to the observer alone, and differ only by viewpoint. In a stereoscopic method, a binocular parallax is used to provide the stereoscopic effects when a left eye two-dimensional image and a right eye two-dimensional image having different viewpoints are recognized in the left eye and right eye of the observer, respectively. Therefore, in the stereoscopic method, the stereoscopic effects cannot be seen in only one of the left eye image and the right eye image, and the observer feels fatigue because a depth perceived by the brain and a focus of the eye do not coincide with each other. On the other hand, since the holographic display device 300 forms the left eye hologram image and the right eye hologram image on positions of a predetermined space, that is, in the left eye LE view zone and the right eye RE view zone of the observer, the depth perceived by the brain and the focus of the eye coincide with each other and full parallax may be provided. The reason why the holographic display device 300 according to the present exemplary embodiment provides only a binocular viewpoint is that since the observer may recognize only two viewpoints with the left eye LE and the right eye RE, data throughput may be reduced by removing viewpoint information other than viewpoint information that may be recognized by the observer. However, a holographic display device according to various exemplary embodiments may provide more viewpoints.

A position on which the hologram image is focused may be adjusted by the first and second beam steerers 330 and 335. That is, by the first and second beam steerers 330 and 335, a left eye position on which the left eye hologram image is focused, and a right eye position on which the right eye hologram image is focused may be adjusted. A unique interval between the left eye and right eye of each viewer may be sensed by the eye tracking sensor 370 and a change in the left eye and right eye positions due to a motion of the viewer may be sensed. According to sensed information, the first and second beam steerers 330 and 335 may control the traveling direction of the light beam.

Either one of the first beam steerer 330 and the second beam steerer 335 may be a liquid crystal deflector for diffracting an incident light to produce two light beams traveling at different angles. When any one of the first and second beam steerers 330 and 335 spatially separates the light to face the left eye and the right eye at the same time, the time sequential driving of the light source 110 may be unnecessary.

The field lens 340 may focus a direction-controlled light in the first and second steerers 330 and 335 on a predetermined space. The field lens 340 may form a 3D image with reduced chromatic aberration by employing the field lenses 110 and 200 of various exemplary embodiments described with reference to FIGS. 4 through 9.

The direction-controlled light in the first and second beam steerers 330 and 335 is incident on the spatial light modulator 350 through the field lens 340. The spatial light modulator 350 may serve to form a hologram pattern having an interference pattern for modulating the incident light. The incident light is diffracted and modulated by the hologram pattern formed by the spatial light modulator 350, and thus the hologram image may be reproduced without chromatic aberration on a predetermined spatial position.

A holographic display device according to an exemplary embodiment may be applied to, for example, a mobile phone. When a user views a screen of the mobile phone using the eye tracking device 370 and a beam steerer, a 3D image may be displayed according to a position of the eye by tracking a movement of a position of the user's eye. Further, the holographic display device according to an exemplary embodiment may be mounted on any of various devices requiring a chromatic aberration reduction ultra-thin holographic display, such as a tablet, a 3D television, a monitor, a projector, or the like.

In a holographic display device according to any of various exemplary embodiments described above, a field lens includes a plurality of anisotropic diffractive lenses 211, 213, and 215 and wavelength selective polarization modulation devices disposed between the anisotropic diffractive lenses 211, 213, and 215, thereby reducing chromatic aberration when a 3D image is focused on a predetermined space. For example, since a diffractive lens satisfies a relation equation of $\lambda f = c$, when a wavelength is changed, a focal length varies, and chromatic aberration may be prevented when the 3D image is focused. However, according to a holographic display device according to another exemplary embodiment, a combination of the plurality of anisotropic diffractive lenses 111, 113, and 115 and wavelength selective polarization modulation lenses may be configured as shown in FIG. 4 in order for each of the plurality of anisotropic diffractive lenses 111, 113, and 115 of a field lens to function as a lens with respect to only a specific color light of a specific polarization, thereby reducing chromatic aberration when the 3D image is focused on the predetermined space. Also, the field lens may include a plurality of anisotropic diffractive lenses each functioning as a focusing lens with respect to a first polarization, e.g. a right circular polarization, and as a diverging lens with respect to a second polarization, e.g. a left circular polarization, and a combination of the plurality of anisotropic diffractive lenses 211, 213, and 215 and wavelength selective polarization modulation lenses may be configured as shown in FIG. 6, thereby reducing chromatic aberration when the 3D image is focused on the predetermined space.

According to a holographic display device according to an exemplary embodiment, a field lens for focusing a 3D image reproduced by a holographic display includes a plurality of anisotropic diffractive lenses each functioning as a lens with respect to a specific polarized light and wavelength selective polarization modulation devices disposed between the plurality of anisotropic diffractive lenses, thereby reducing chromatic aberration by a combination of the anisotropic diffractive lens and the wavelength selective polarization modulation devices.

It should be understood that exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A holographic display device comprising:
    a holographic display configured to reproduce a three-dimensional (3D) image; and
    a field lens configured to focus the 3D image reproduced by the holographic display,
    wherein the field lens comprises:
        a plurality of anisotropic diffractive lenses including a first anisotropic diffractive lens configured to function as a lens with respect to light having a first polarization and a second anisotropic diffractive lens configured to function as a lens with respect to light having a second polarization orthogonal to the first polarization, and
        a plurality of wavelength selective polarization modulation devices comprising a first wavelength selective polarization modulation device and a second wavelength selective polarization modulation device,
    wherein each of the plurality of anisotropic diffractive lenses is configured to function as a converging lens that converges the light towards a point based on the light having the first polarization and function as a diverging lens that diverges the light away from the point based on the light having the second polarization,
    wherein the first wavelength selective polarization modulation device is provided on an optical path in front of the first anisotropic diffractive lens, and the first wavelength selective polarization modulation device is configured to output a first color light having the first polarization towards the first anisotropic diffractive lens, and a second color light having the second polarization orthogonal to the first polarization towards the first anisotropic diffractive lens, and
    wherein the second wavelength selective polarization modulation device provided between the first anisotropic diffractive lens and the second anisotropic diffractive lens, and the second wavelength selective polarization modulation device is configured to output the first color light, in which, the polarization is changed to the second polarization, and output the second color light, in which, the polarization of the second color light is changed to the first polarization.

2. The holographic display device of claim 1, wherein each of the plurality of wavelength selective polarization modulation devices comprises a polarization forming unit configured to polarize at least one color of light incident on the polarization forming unit, such that the first a first anisotropic diffractive lens of the plurality of anisotropic diffractive lenses functions as a lens with respect to at least one color of light incident on the field lens.

3. The holographic display device of claim 1, wherein the first polarization is a right circular polarization and the second polarization is a if a left circular polarization.

4. The holographic display device of claim 1, wherein each of the plurality of anisotropic diffractive lenses has a focal length different from a focal length of each other of the plurality of anisotropic diffractive lenses.

5. The holographic display device of claim 1, further comprising:
an additional wavelength selective polarization modulation device configured to equally modulate polarizations of a plurality of colors of light output from the plurality of anisotropic diffractive lenses.

6. The holographic display device of claim 5, wherein the field lens has a stacked structure in which the plurality of anisotropic diffractive lenses and the plurality of wavelength selective polarization modulation devices are alternately stacked; and
wherein the field lens further comprises a polarization converter configured to convert a polarization of light output from the stacked structure.

7. The holographic display device of claim 6, wherein the polarization converter comprises quarter wave plate.

8. The holographic display device of claim 2, wherein each of the plurality of anisotropic diffractive lenses is configured to function as a lens with respect to at least one color of light having the first polarization,
wherein a plurality of m colors of light are incident on the field lens, wherein m is equal to or greater than 3, and
wherein each of the plurality of wavelength selective polarization modulation devices is configured to modulate a polarization of light incident thereon according to wavelength, such that, of the plurality of m colors of light output from each of the plurality of wavelength selective polarization modulation devices, at least one of the plurality of m colors of light has have the first polarization and at least one of the plurality of m colors of light has the second polarization.

9. The holographic display device of claim 8, wherein the first polarization is a first linear polarization and the second polarization is a second linear polarization orthogonal to the first linear polarization.

10. The holographic display device of claim 1, wherein at least one of the plurality of anisotropic diffractive lenses is a liquid crystal lens comprising a liquid crystal array forming a geometrical phase arrangement, thereby implementing a geometric phase lens.

11. The holographic display device of claim 1, wherein the holographic display comprises:
a backlight comprising a light source and a light guide plate configured to guide a light from the light source; and
a spatial light modulator configured to diffract the light incident from the backlight to reproduce the 3D image.

12. The holographic display device of claim 11, wherein the field lens is disposed on an optical path after the spatial light modulator or between the backlight and the spatial light modulator.

13. The holographic display device of claim 11, wherein at least one of the plurality of anisotropic diffractive lenses is a liquid crystal lens comprising a liquid crystal array forming a geometrical phase arrangement, thereby implementing a geometric phase lens.

14. A holographic display device comprising:
a holographic display configured to reproduce a three-dimensional (3D) image; and
a field lens configured to focus the 3D image reproduced by the holographic display,
wherein the field lens comprises:
a plurality of anisotropic diffractive lenses each configured to function as a lens with respect to at least one of the light having a first polarization and the light having a second polarization orthogonal to the first polarization, and
wherein the plurality of anisotropic diffractive lenses comprise a first anisotropic diffractive lens, a second anisotropic diffractive lens, and a third anisotropic diffractive lens,
wherein the field lens further comprises a polarization forming unit configured to polarize at least one color of light incident on the polarization forming unit, such that the first anisotropic diffractive lens of the plurality of anisotropic diffractive lenses functions as a lens with respect to at least one color of light incident on the field lens,
wherein the polarization forming unit comprises a first wavelength selective polarization modulation device, disposed on an optical path in front of the first anisotropic diffractive lens such that a polarization of at least a first color of light incident onto the field lens has one of the first polarization or the second polarization orthogonal,
wherein the plurality of wavelength selective polarization modulation devices comprise:
a second wavelength selective polarization modulation device disposed between the first anisotropic diffractive lens and the second anisotropic diffractive lens; and
a third wavelength selective polarization modulation device disposed between the second anisotropic diffractive lens and the third anisotropic diffractive lens,
wherein a value c1 is a product of a wavelength of light incident on the first anisotropic diffractive lens and a focal length of the first anisotropic diffractive lens at the wavelength incident thereon, a value c2 is a product of a wavelength of light incident on the second anisotropic diffractive lens and a focal length of the second anisotropic diffractive lens at the wavelength incident thereon, and a value c3 is a product of a wavelength of light incident on the third anisotropic diffractive lens and a focal length of the third anisotropic diffractive lens at the wavelength incident thereon;
wherein a total focal length of the first wavelength selective polarization modulation device, the second wavelength selective polarization modulation device, and the third wavelength selective polarization modulation device, with respect to a first color of light having a wavelength of $\lambda 1$ is e $f_{total\_1}$; a total focal length of the first wavelength selective polarization modulation device, the second wavelength selective polarization modulation device, and the third wavelength selective polarization modulation device, with respect to a second color of light having a wavelength of λ2 is $f_{total\_2}$; and a total focal length of the first wavelength selective polarization modulation device, the second wavelength selective polarization modulation device, and the third wavelength selective polarization modulation device, with respect to a third color of light having a wavelength of λ3 is $f_{total\_3}$; and wherein modulation coefficients indicating modulation states of the first wavelength selective polarization modulation device, the second wavelength selective polarization modulation device, and the third wavelength selective polarization modulation device and an unique characteristic values c1, c2, and c3 satisfy a same focal length $f=f_{total\_1}=f_{total\_2}=f_{total\_3}$ with respect to the first color of light, the second color of light, and the third color of light and thus satisfy an Equation below, $$\begin{pmatrix} 1/c_1 \\ 1/c_2 \\ 1/c_3 \end{pmatrix} = \frac{1}{f} \begin{bmatrix} m_{11} & m_{12} & m_{13} \\ m_{21} & m_{22} & m_{23} \\ m_{31} & m_{32} & m_{33} \end{bmatrix}^{-1} \begin{pmatrix} 1/\lambda_1 \\ 1/\lambda_2 \\ 1/\lambda_3 \end{pmatrix}$$ [Equation]

wherein $m_{ij}$ is a modulation coefficient indicating the modulation states of the first wavelength selective polarization modulation device, the second wavelength selective polarization modulation device, and the third wavelength selective polarization modulation device and functioning when a color light of an ith wavelength passes through a jth anisotropic diffractive lens.

15. The holographic display device of claim 14, wherein one of the first polarization and the second polarization is a right circular polarization and the other of the first polarization and the second polarization is a left circular polarization, wherein each of the first anisotropic diffractive lens, the second anisotropic diffractive lens, and the third anisotropic diffractive lens is configured as a focusing lens with respect to a light of the first polarization and as a diverging lens with respect to a light of the second polarization, and configured such that light of the first polarization incident thereon is emitted therefrom as light of the second polarization, and that light of the second polarization incident thereon is emitted therefrom as light of the first polarization, wherein $m_{ij}$ is one of +1, which enables the jth anisotropic diffractive lens to function as a focusing lens, and −1, which enables the jth anisotropic diffractive lens to function as a diverging lens with respect to the color light of the ith wavelength, and modulation coefficients of the first wavelength selective polarization modulation device, the second wavelength selective polarization modulation device, and the third wavelength selective polarization modulation device are determined such that an inverse function of a modulation matrix is satisfied.

16. The holographic display device of claim 14, wherein the first polarization is a first linear polarization and the second polarization is a second linear polarization orthogonal to the first linear polarization, wherein each of the first anisotropic diffractive lens, the second anisotropic diffractive lens, and the third anisotropic diffractive lens is configured to function as a lens with respect to at least one color of light having the first polarization, wherein $m_{ij}$ is one of 1, which enables the jth anisotropic diffractive lens functions as a lens with respect to the color light of the ith wavelength, and 0, which enables the jth anisotropic diffractive lens to transmit the color light of the ith wavelength without diffraction, and modulation coefficients of the first wavelength selective polarization modulation device, the second wavelength selective polarization modulation device, and the third wavelength selective polarization modulation device are determined such that an inverse function of a modulation matrix is satisfied.

17. A holographic display device comprising:
a holographic display; and
a field lens comprising:
a plurality of anisotropic diffractive lenses including a first anisotropic diffractive lens configured to function as a lens with respect to light having a first polarization and a second anisotropic diffractive lens configured to function as a lens with respect to light having a second polarization orthogonal to the first polarization, and a plurality of wavelength selective polarization modulation devices comprising a first wavelength selective polarization modulation device and a second wavelength selective polarization modulation devices, wherein, for each of the plurality of anisotropic diffractive lenses, a product of a wavelength of light and a focal length of the respective anisotropic diffractive lens with respect to the wavelength is a fixed characteristic value, and wherein each of the plurality of anisotropic diffractive lenses is configured to function as a converging lens that converges the light towards a point based on the light having the first polarization and function as a diverging lens that diverges the light away from the point based on the light having the second polarization, wherein the first wavelength selective polarization modulation device is provided on an optical path in front of the first anisotropic diffractive lens, and the first wavelength selective polarization modulation device is configured to output a first color light having the first polarization towards the first anisotropic diffractive lens, and a second color light having the second polarization orthogonal to the first polarization towards the first anisotropic diffractive lens, and wherein the second wavelength selective polarization modulation device provided between the first anisotropic diffractive lens and the second anisotropic diffractive lens, and the second wavelength selective polarization modulation device is configured to output the first color light, in which, the polarization is changed to the second polarization, and output the second color light, in which, the polarization of the second color light is changed to the first polarization.

* * * * *